United States Patent
Katti et al.

(10) Patent No.: US 9,015,303 B2
(45) Date of Patent: Apr. 21, 2015

(54) MESSAGE QUEUE BEHAVIOR OPTIMIZATIONS

(75) Inventors: Jayteerth Katti, Redmond, WA (US); Kartik Paramasivam, Redmond, WA (US); Stuart John Langley, Woolooware (AU); Pramod Gurunath, Sammamish, WA (US); Muralidhar Krishnaprasad, Redmond, WA (US); Elvin Morales, Kew Gardens, NY (US); Manu Srivastava, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 348 days.

(21) Appl. No.: 13/230,823

(22) Filed: Sep. 12, 2011

(65) Prior Publication Data

US 2013/0066977 A1    Mar. 14, 2013

(51) Int. Cl.
*G06F 15/173* (2006.01)
*H04L 12/58* (2006.01)

(52) U.S. Cl.
CPC ............... *H04L 51/26* (2013.01); *H04L 51/30* (2013.01)

(58) Field of Classification Search
USPC .......... 709/201–203, 212, 217, 219, 238, 200
See application file for complete search history.

(56) References Cited

U.S. PATENT DOCUMENTS

| | | | |
|---|---|---|---|
| 6,085,277 A | | 7/2000 | Nordstrom et al. |
| 6,199,068 B1 * | | 3/2001 | Carpenter ............................. 1/1 |
| 6,477,580 B1 * | | 11/2002 | Bowman-Amuah .......... 709/231 |
| 6,496,850 B1 * | | 12/2002 | Bowman-Amuah .......... 709/203 |
| 6,578,068 B1 * | | 6/2003 | Bowman-Amuah .......... 709/203 |
| 6,640,244 B1 * | | 10/2003 | Bowman-Amuah .......... 709/207 |
| 6,715,145 B1 * | | 3/2004 | Bowman-Amuah .......... 718/101 |
| 6,742,015 B1 * | | 5/2004 | Bowman-Amuah .......... 718/101 |
| 6,842,906 B1 * | | 1/2005 | Bowman-Amuah .......... 719/330 |
| 7,167,923 B2 * | | 1/2007 | Lo ................................. 709/245 |
| 7,478,058 B2 * | | 1/2009 | Byrne .......................... 705/26.2 |
| 7,539,781 B1 | | 5/2009 | Bali et al. |
| 7,865,684 B2 | | 1/2011 | Michaylov et al. |

(Continued)

OTHER PUBLICATIONS

Marazakis, et al., "Optimization and Bottleneck Analysis of Network Block I/O in Commodity Storage Systems", Retrieved at <<http://citeseerx.ist.psu.edu/viewdoc/download?doi=10.1.1.127.2962&rep=rep1&type=pdf>>, Proceedings of the 21st annual international conference on Supercomputing (ICS), Jun. 18-20, 2007, pp. 10.

(Continued)

*Primary Examiner* — Sargon Nano
(74) *Attorney, Agent, or Firm* — Benjamin Tabor; Katherine Drakos; Micky Minhas

(57) ABSTRACT

Network and storage calls are reduced by batching messages. Messages are collected from a client and sent to the gateway or backend application in one round trip. Alternatively, the messages are collected for different entities, and the batched messages are durably stored. Related messages, which may have the same sessionID, are grouped into a logical unit or session. This session may be locked to a single message consumer. A session may be associated with an application processing state as an atomic unit of work while other operations are performed on the messages in the session. Acknowledgements are accumulated by a broker on a message server, but the messages are not immediately deleted. Instead, multiple messages in a selected range are periodically truncated from a message store in a single operation. Expired messages for active sessions are proactive cleaned up to prevent sessions from reaching a quota or limit.

13 Claims, 4 Drawing Sheets

(56) References Cited

U.S. PATENT DOCUMENTS

| | | | |
|---|---|---|---|
| 7,945,631 B2 | 5/2011 | Chkodrov et al. | |
| 8,244,877 B2* | 8/2012 | Yeoum et al. | 709/227 |
| 2002/0108121 A1* | 8/2002 | Alao et al. | 725/110 |
| 2005/0289214 A1* | 12/2005 | Adjakple et al. | 709/200 |
| 2006/0047666 A1* | 3/2006 | Bedi et al. | 707/10 |
| 2006/0277319 A1 | 12/2006 | Elien et al. | |
| 2009/0133038 A1 | 5/2009 | Chkodrov et al. | |
| 2009/0133039 A1* | 5/2009 | Chkodrov et al. | 719/314 |
| 2010/0008377 A1 | 1/2010 | Hasti et al. | |
| 2010/0131554 A1* | 5/2010 | Cooper | 707/770 |
| 2010/0318654 A1* | 12/2010 | Paramasivam et al. | 709/225 |
| 2011/0023034 A1 | 1/2011 | Nelson et al. | |
| 2013/0159517 A1* | 6/2013 | Kumarjiguda et al. | 709/224 |

OTHER PUBLICATIONS

Koller, et al., "I/O Deduplication: Utilizing Content Similarity to Improve I/O Performance", Retrieved at <<https://www.usenix.org/events/fast10/tech/full_papers/koller.pdf>>, Proceedings of the 8th USENIX conference on File and storage technologies (FAST), 2010, pp. 1-14.

Khabbaz, et al., "Disruption-Tolerant Networking: A Comprehensive Survey on Recent Developments and Persisting Challenges", Retrieved at <<http://www.wissamfawaz.com/PUBs/fawazSurvTut11.pdf>>, IEEE communications surveys & tutorials, accepted for publication, Digital Object Identifier, Jul. 14, 2010, pp. 1-34.

* cited by examiner

MESSAGE QUEUE BEHAVIOR OPTIMIZATIONS

BACKGROUND

In a typical messaging system, many concurrent clients send and receive messages to and from the messaging system. Often, these clients send only one or just a small number of messages at a time. This interaction pattern between the clients and the messaging system increases system workload and Independent calls to the message server by different clients increase the number of round-trips to the message server. Each call to the server typically has extra headers or other overhead that needs construction, transfer and processing. This work increases network activity, increases CPU utilization for both the client and server, and reduces the overall system throughput.

In other scenarios, when messages are persisted to a durable store, independent operations by different clients result in more round-trips to the durable store. One or more round-trips may be required per message. Durable stores such as databases and disk systems are generally optimized for small number of bulk or chunky operations. Even though each round-trip involves in just a small amount of I/O operation, an increased number of round-trips results fewer number of message operations on the durable store.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the invention provide batching and other message handling techniques. In one form, batching of messages comprises the act of collecting messages or acknowledgements from a client and sending the collected messages to a gateway or backend application in one round trip. In another form, batching of messages comprises the act of collecting messages or acknowledgements for different entities, such as queues or topics, in a backend application or broker, and storing this information durably, such as by writing to a database.

As used in embodiments of the invention, processing messages using sessions comprises the act of grouping a bunch of related messages, which may have the same sessionID, for example, as a logical unit. This session or group of messages with a common session ID may be locked to a single consumer among all the competing consumers or backend applications. In another embodiment, processing messages using sessions comprises the ability to associate an application processing state or session state with a session. This may be accomplished as an atomic unit of work along with performing other operations on the same queue/topic.

Messages may be stored in queues. A queue can be either sessionful, wherein every message enqueued to such a queue has to have a sessionID, or sessionless, wherein the messages enqueued to the queue do not need to have a sessionID.

Completing a message does not delete the message immediately. Instead, a broker accumulates message acknowledgements and then truncates or deletes multiple messages from the store in one operation.

In another embodiment, expired messages may be proactively cleaned up to ensure a session has sufficient space for future messages.

Embodiments of the invention reduce network and random storage communications. Additional embodiments optimize the storage operations for messages and acknowledgements, provide low-latency messaging, and manage message expiration.

Embodiments reduce the number of network and storage calls by batching groups of such calls together into one transaction. Calls from multiple messaging clients are automatically combined into one network call from a client library to a message server. This reduces the network IO and allows the message server to perform additional optimizations. Additionally, storage messaging operations from multiple clients may be combined into one store operation.

Overhead generated by message acknowledgement processing is reduced by transforming an acknowledgement list into a range of acknowledgements. Messages corresponding to the range of acknowledgements are bulk processed.

Embodiments provide optimization for low-latency scenarios when both a publisher and a consumer are connected or when the consumer is momentarily disconnected. Optimization is provided by completely bypassing or reducing store round-trips when the consumer is available to receive the message immediately.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

A message queuing server or platform may be optimized using the embodiments disclosed herein to provide durability of communications between clients, and other clients, applications, or storage. The system and methods allow an infrastructure to guarantee that messages will not be lost and will be sent in the correct order. Additionally, messaging operations may be performed atomically. If N operations need to be performed, then all N operations are processed as one unit.

Message Batching.

Figure 1:
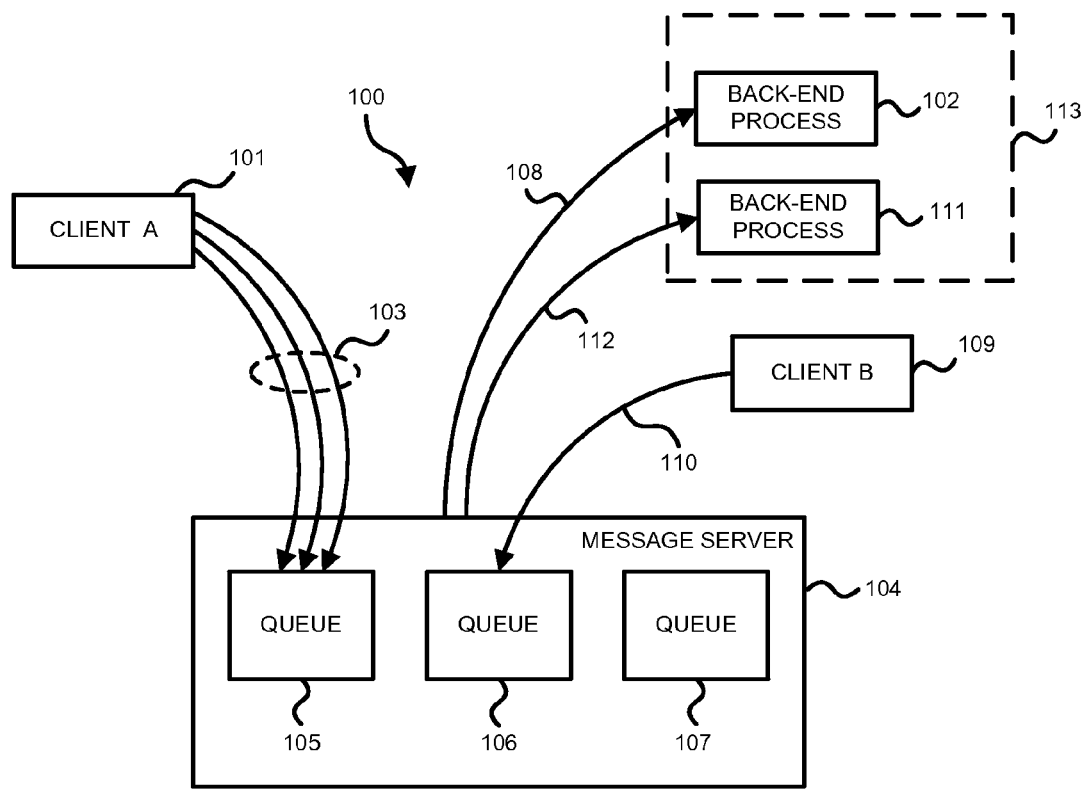
FIG. 1 illustrates a system using batching where multiple messages between two clients are turned into single message.

FIG. 1 illustrates a system 100 using batching where multiple messages calls between client A 101 and a message consumer, such as back-end process 102, are turned into single call. Client A 101 sends multiple calls or messages 103 to back-end process 102. Messages 103 are processed by messaging server 104, which is responsible for routing the messages from multiple clients to the appropriate destination process. Messages 103 may be separate messages or they may be fragments or sub-parts of a larger message. In prior systems, messaging server 104 would send each message 103 to back-end process 102 individually. In embodiments of the present invention, messaging server 104 comprises a number of queues 105-107. Messaging server 104 assigns a queue 105 to client A 101, back-end process 102, or a particular interaction between client A 101 and back-end process 102. Instead of sending each message or call 103 directly to back-end process 102, messaging server 104 collects the messages 103 in queue 105. The messages 103 may be collected for a particular period of time, for example, and then they are sent as a group to back-end process 102 in a single message or call 108.

As used herein, the terms client and back-end process refer to any party, device, process, or application that sends messages to, or receives messages from, the message server. A client that sends messages may be referred to as message publisher or message publishing application. A back-end process that receives messages may be referred to as a message consumer or a message consuming application. The term server refers to a party, device, or application that provides message queuing services. A server may use a durable or non-durable store to store messages and states. Durable store refers to the storage layer of the message server. This layer persists messages to a permanent medium such as a database or disk. Non-durable store refers to the store layer, which does not store messages in persistent medium. Such a store keeps the messages and states in memory Messaging client 101 sends requests 103 to message server 104 using a client library. The client library exposes a shared proxy component that interacts with the message server 104 on behalf of the client 101. Calls and messages from multiple clients are buffered inside the client library.

If a second client B 109 is sending messages 110 to back-end process 102, the messages 110 are also buffered in message server 104. Messages 110 from client B 109 are buffered in queue 106, which may be the same queue used for messages 103 or a different queue. Message queues 105-107 in message server 104 may be assigned based upon a sending client identity, a receiving client identity, a session identifier, or some other parameter.

When the number of entries in the queues 105-107 reach a certain threshold or after a certain time period elapses, the client library sends all the message data in network call 108 to the destination back-end process 102. Queues 105-107 may be a buffer, a memory stack, or any other storage. The threshold used to determine when messages will be sent from queues in message server 104 to destination back-end process 102 may be based on thresholds that are set for each individual queue 105-107 or for an overall total threshold for all the queues 105-107 combined.

In other embodiments, a user-supplied transaction may force batching of a group of messages to be sent to the message consumer in order to keep processing of the batch of messages atomic.

Message queues 105-107 may be sessionless or sessionful. In a sessionless queue, the messages are unrelated and all messages in a queue may be routed to the back-end process 102. In a sessionful queue, messages are organized by session. Each queue 105-107 may be associated with one or more sessions. As messages 103, 110 arrive at server 104, the messages are routed to the appropriate queue 105-107 based upon a session identifier in the message. All of the messages for a particular session are grouped on to the same queue 105-107. Each session is associated with a particular consumer, such as back-end process 102. Back-end process 102 may request all messages from server 104 or messages for a particular session. Message server 104 then sends all of the messages for the requested session(s) to back-end process 102. In this way, back-end process 102 only receives the messages for the sessions that it is responsible for processing, and back-end process 102 does not have to sort out messages for unrelated sessions.

In one example, back-end process may be part of an order-processing application, and clients A and B may be users submitting orders to the application. The orders may be organized into different sessions based upon client location, such as a city associated with an order. Back-end process 102 may process all messages for a particular city by requesting all messages for the associated session. The back-end process 102 may then apply the appropriate city-specific processing to those orders, such as tax rates, delivery options, etc.

Multiple back-end processes 102, 111 may receive messages from message server 104. For example, processes 102 and 111 may each be assigned one or more sessions to process. Process 102 receives only its sessions 108, and process receives only its sessions 112. Processes 102 and 111 may be different applications or may be different instances of the same application. Additionally, processes 102 and 111 may be running on the same physical or virtual machine 113 or on different machines.

Using the message batching optimization as illustrated in FIG. 1, the number of message round trips required in system 100 can be reduced. Instead of sending individual messages to back-end processes 102, 111, all of the messages for a particular session may be sent as a single group 108, 112 to the appropriate destination application.

Prefetching.

Another optimization provided by the system illustrated in FIG. 1 is prefetching by the destination client. For example, when client B 102 requests the next message from message server 104, all pending messages in queues 105-107 that directed to the client B 102 are batched together and delivered to client B 102 in a single message 108. In this way, even if a time or volume threshold for sending messages to a destination client has not been achieved, those messages are still available to the destination process. Accordingly, back-end process 102 can request a next message when it is ready for further processing, and back-end process 102 will receive all pending messages from queues 105-107 that are associated with its sessions.

The load for a particular application may be partitioned into a number of sessions across multiple back-end processes 102, 111. Each session is associated with a specific back-end process, and each back-end processes may support multiple sessions. If a back-end process (e.g. 102) dies or is unavailable, then the sessions associated with that process may be reassigned to another back process (e.g. 111). The unconsumed messages in the reassigned sessions are then processed by the new back-end process (111).

Session Locking.

If multiple consumers or back-end processes are consuming sessions from a queue, each session is marked as 'locked' and is assigned to a unique consumer. As long as the consumer is receiving messages from the session, the session lock is renewed for that consumer. If the consumer for a particular session dies and, therefore, stops retrieving or receiving messages for that session, then a session lock will timeout at the message server/broker, and the session will be marked as 'available' in the message server. When a new consumer requests an available session from the message server, then the message server will return this unlocked, available session to this new consumer.

Session Grouping.

Figure 2:
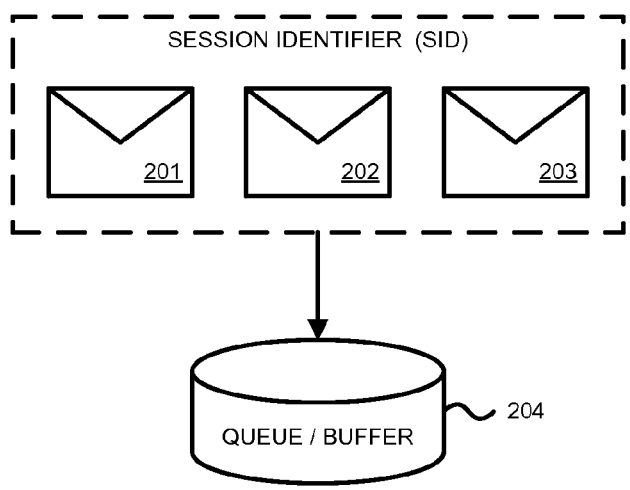
FIG. 2 illustrates a system in which messages associated with the same session are grouped together.

FIG. 2 illustrates grouping messages associated with the same session. Messages 201-203 may be related to the same session, which may be identified by a session identifier (SID), for example. As the message server receives messages, it groups messages related to the same SID into the same queue 204. When queue 204 reaches a threshold number of messages, or when a predetermined period elapses, the message server then sends all of the messages 201-203 associated with the session to the destination client in a single transaction. Alternatively, using prefetching, when a client requests a next message for a particular session, all of the messages related to that session—for example, all the messages in session queue 204—are sent to the client in a single transaction.

Figure 3:
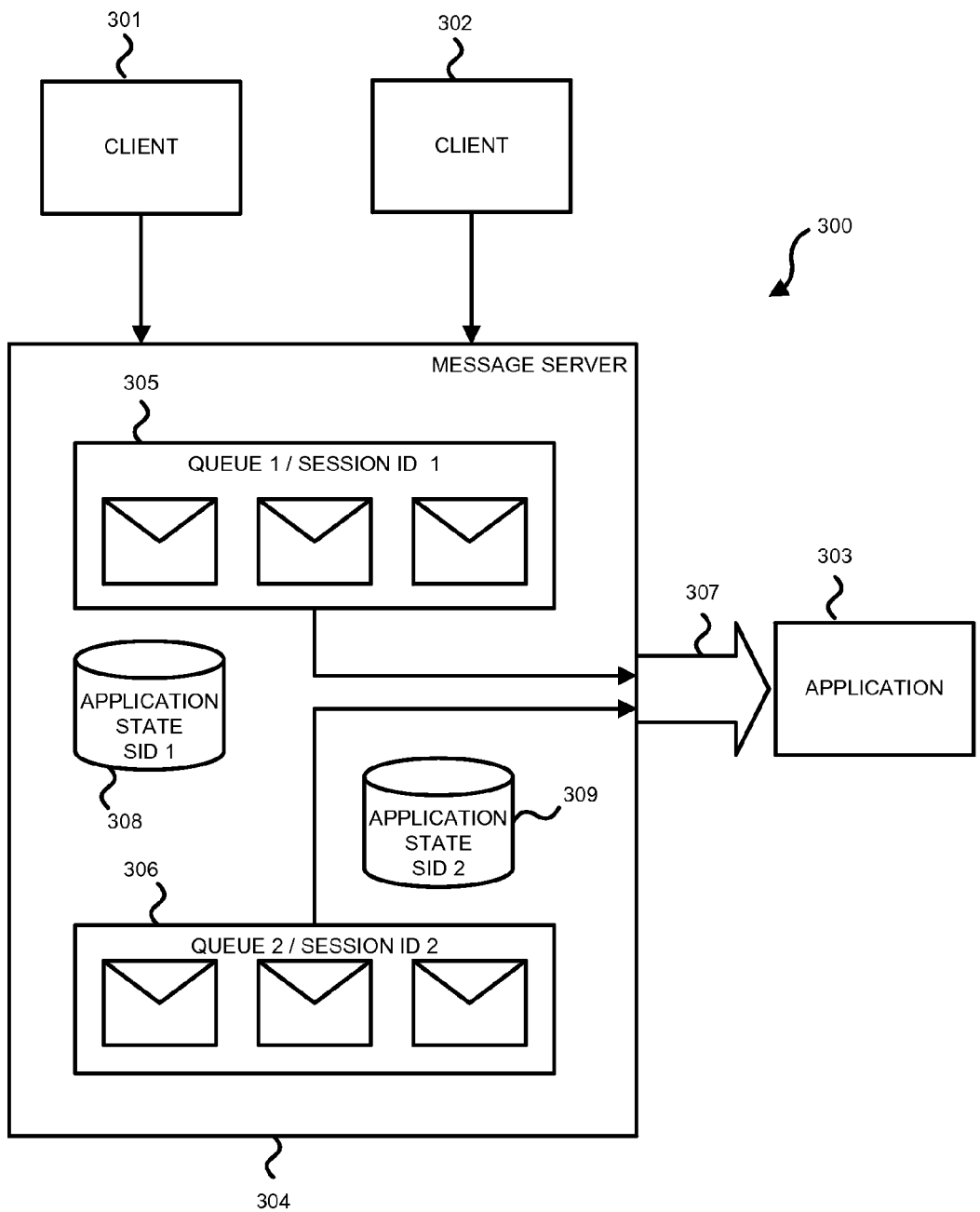
FIG. 3 illustrates a system in which messages are grouped according to session identifiers.

FIG. 3 illustrates a system 300 in which messages are grouped according to session identifiers. Clients 301, 302 interact with application 303 via message server 304. The communications between client 301 and application 303 are assigned session identifier SID 1, and communications between client 302 and application 303 are assigned session identifier SID 2. Message server 304 groups messages the messages based upon their session identifier. Messages from client 301 are grouped in queue 1 305, and messages from client 302 are grouped in queue 306 by messages server 304.

Messages from queues 305 and/or 306 may be sent to application 303 as a single transaction 307 when a threshold is reached, such when the queue holds a predetermined number of messages or at predetermined intervals. Application 303 and message server 304 may agree whether or not messages from different queues or sessions may be combined into the same transaction 307. Additionally, using prefetching, application 303 may request a next message either from any client or for a particular session. Message server 304 may send all queued messages as single transaction 307 for all sessions or for the requested session.

System 300 provides more efficient messaging between message server 304 and application 303 and allows for application to process multiple clients in parallel. Instead of requiring application 303 to receive messages from clients 301 and 302 sequentially in the order sent by the clients, application 303 can process all pending messages from one client while message server 304 is queuing messages from other clients. Message server 304 and application 303 can process each group (i.e. each SID) of client messages independently and concurrently.

Message server 304 may further comprise an application state 308, 309 for each session, which allows message server 304 to monitor the processing state for each session. Message server 304 can update the status of all messages in a queue by one update to application state 308, 309. For example, the application state may be used to set session-specific thresholds or to indicate that a particular session or client is paused, suspended, or inactive.

In an example embodiment, application 303 may be part of an order processing application that processes orders from users at clients 301 and 302. Each client order is assigned a session identifier. Order processing application 303 may process multiple orders from different clients 301, 302 in parallel. Messages associated with each client's orders are grouped into a queue based upon the session identifiers. The application state may be used to monitor the status of each order, such as tracking how far each order has been processed and whether additional applications are involved in the order. For example, a client's order may be inactive or paused while waiting for input from a separate payment or shipping application. Message server 304 may hold or forward messages for that session based upon the application state.

Figure 4:
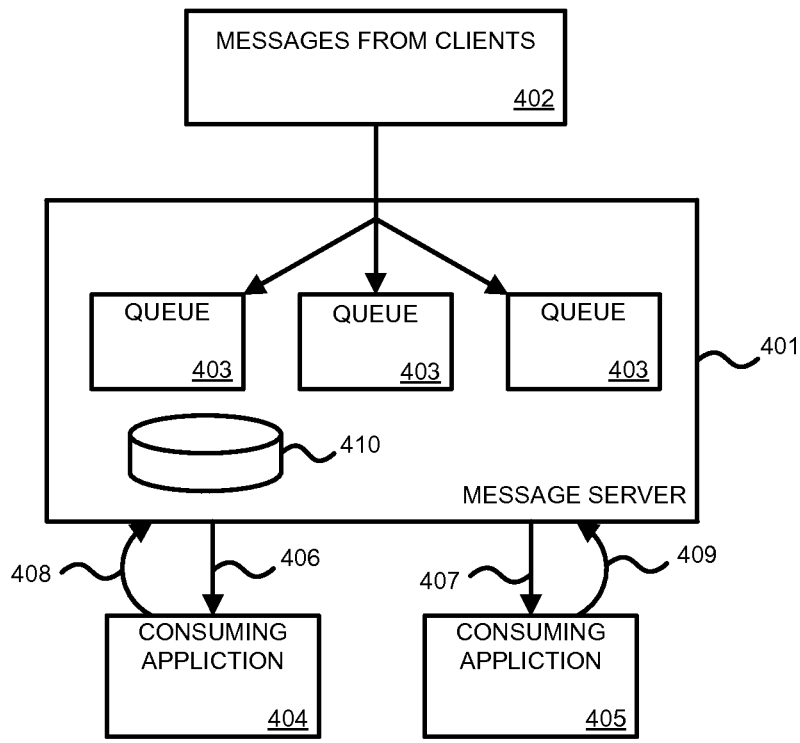
FIG. 4 illustrates an embodiment in which a message server uses buffering techniques to reduce the number of store operations.

FIG. 4 illustrates an embodiment in which a message server stores processing state data for the sessions. Message server 401 receives messages 402 various from clients. Each message is associated with a session, which may be determined, for example, from a session identifier in the message header. Messages server 401 stores each message into the appropriate queue 403 based upon the session associated with the message. Consuming applications 404 and 405 request and process messages for different sessions in queues 403. Consuming applications 404, 405 may be a back-end process, storage medium, database, or other any application that processes client messages or commands. The system of FIG. 4 allows for cross-entity batching in which messages from multiple, independent clients 402 are grouped together into a single session 406, 407 that is processed by the consuming applications 404, 405.

From time to time, consuming applications 404, 405 may push processing state information 408, 409 back to message server 401, which stores the session-state information in durable data store or memory 410. The session-state information is associated with the relevant session in message server 401. The session-state information may indicate, for example, the current status of session processing or an acknowledgement of message processing. The session-state information is available to the original or a new consuming application, which can use the information to determine where to continue processing the session. The session-state information may be used, for example, to ensure that each message is processed only once.

In one embodiment, to keep the session information consistent, the consuming application processes messages and stores session state data in a single transaction as an atomic unit of work. The consuming application receives and processes a message for a particular session. The consuming application then notifies the message server that it has processed the message and stores updated state information for the session in the message server.

Message Truncation.

Figure 5:
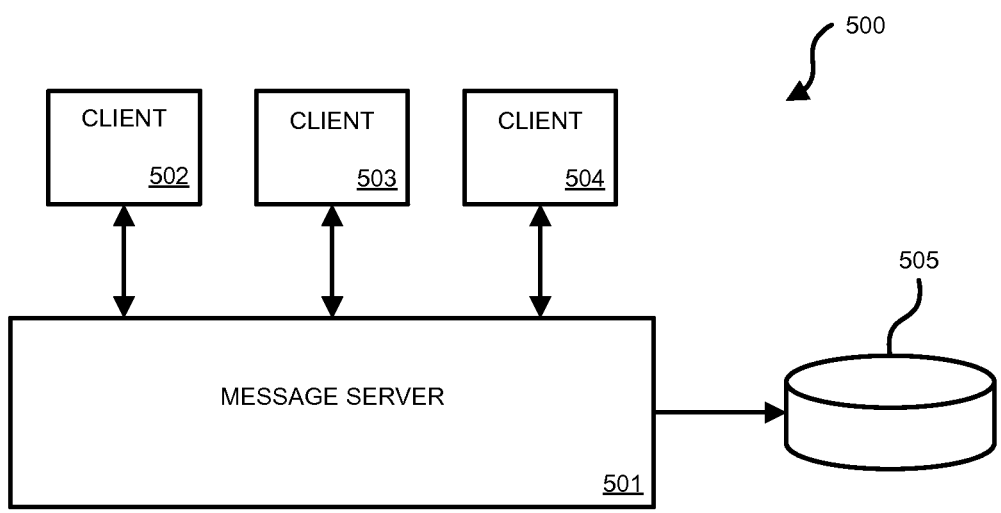
FIG. 5 illustrates a system using an optimized storage operation for message truncation according to one embodiment.

FIG. 5 illustrates a system 500 using an optimized storage operation for message truncation according to one embodiment. Message server 501 processes messages and receives acknowledgements from clients 502-504. The acknowledgements are stored to message store 505. Message server 501 needs to durably record these acknowledgements. Typically, this is done by deleting the acknowledged messages from message store 505. However, a high rate of operations to message store 505 reduces throughput. In some cases, messages are consumed out of order or they may be left unprocessed. This can happen, for example, when the client application is not ready to process the message. On the other hand, if the messages are deleted as soon as they are processed, the result is a high amount of random operations on the message store 505.

These issues are addressed in one embodiment by delaying the delete operations and, instead, periodically performing bulk, sequential delete operations. As the messages are acknowledged, the acknowledgments are recorded in permanent message store 505 using a message sequence number. Periodically, the messages sequence numbers are combined together to truncate all messages up to a lowest acknowledged sequence number. In this way, all messages to be deleted can be deleted together in one operation by the message server 501.

For the selective deletion case, message server 501 assumes that the number of unprocessed messages is small. This allows message server 501 to convert a large list of message sequence numbers into a small list of sequence number ranges. In this case, a message range entry is formed by taking only the first and last entry in the contiguous sequence of message sequence numbers. This reduces the amount of data passed to the durable store layer and allows it to perform optimizations around range deletion.

Express Messaging.

Figure 6:
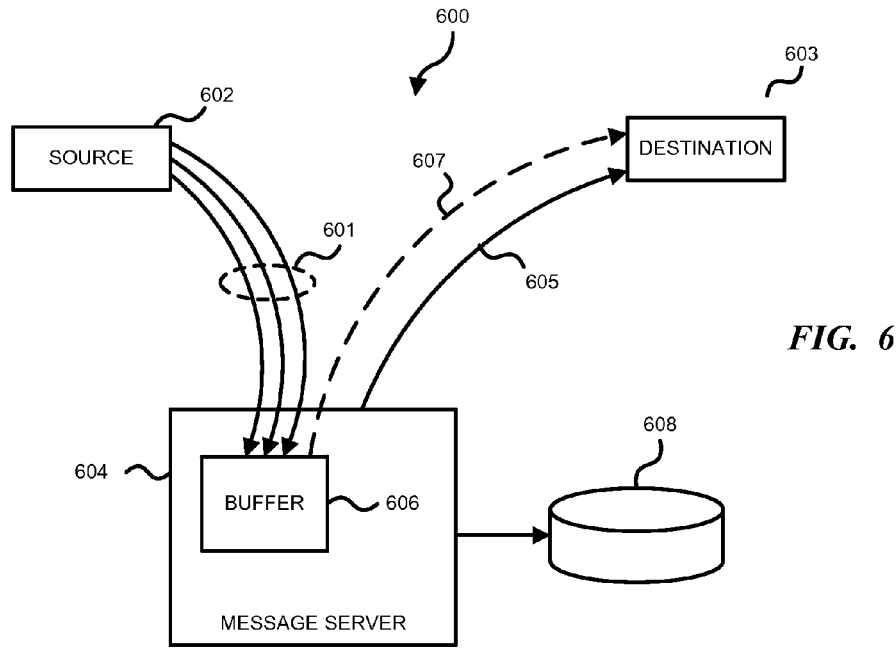
FIG. 6 illustrates a system for buffering or storing messages when a destination device is not available to receive messages.

In some messaging scenarios, the messages are very time critical and need to be delivered with smallest amount of latency. Such a low latency scenario might also require that the message server drop the message if the message cannot be delivered in a timely manner. At the same time, the message server should not consume too many resources, such as memory, if the messages are not consumed at the rate they are being published. In one embodiment, this problem may be addressed as illustrated in FIG. 6.

As messages 601 are published by source 602, if the destination 603 is waiting for the messages 601, then message server 604 delivers the messages (604) immediately to destination 603. However, if destination 603 is not connected or is not actively waiting for messages 601, then message server 604 buffers the messages 601 inside an in-memory buffer 606. If the destination 604 starts requesting messages, then the buffered messages are delivered (607) by the message server 604.

If the in-memory buffer 606 is filled to a certain threshold, the subsequent messages 601 are written directly to a durable store 608. This prevents the message server 604 from consuming unnecessary resources by holding messages in memory.

In one embodiment, message server 604 may use a circular in-memory buffer in which it evicts the oldest messages from the in-memory buffer to make space for new messages. In this case, messages are still delivered in first-in-first-out fashion.

As the messages from in-memory buffer 606 are consumed, stored messages are loaded from the durable store 608 into buffer 606.

In another embodiment, upon message server 604 restart or failover, any existing messages from the durable store 608 are treated as expired and are discarded.

In some cases, both publishers and consumers may be connected to the message server. In traditional messaging scenarios, the message server first puts the message inside a message store and when consumer requests for messages, it reads the message from the store and delivers them. This means that every message must go through a store write and read operation which reduces the overall throughput.

In one embodiment, this problem is addressed as follows. As messages are published, if one or more consumers are waiting for messages, then those messages are delivered to the consumers directly, without persisting them in the store. A client's publish call completes when the consumers acknowledge messages. If the consumers do not acknowledge messages within a certain time interval, the messages are put in the store and the client's publish call completes. In this manner, the message server eliminates the store round-trip in most cases without sacrificing the consistency guarantees.

Also, if consumers are temporarily disconnected as the messages are being published, the message server writes the messages to the underlying store and also caches them in-memory. This way, when consumers ask for messages later, the cached messages may be delivered. This saves trips to the store and hence improves the overall throughput.

Message Expiry.

A message sending application or its administrator may want to limit the amount of time a message can stay in the message server before the message is discarded. Because there may be very many queues—on the order of thousands of queues—it is not a trivial problem to detect expired messages from a durable store without scanning through all the messages. It would require a lot of processing to read through all of the messages on the message store and determine which ones are expired. In one embodiment, the message server handles the expiring messages as described below.

First, the system determines if a queue is loaded in memory. If the queue is loaded in memory, then the system may need to clean out expired messages. If the queue is not loaded in memory, then no clients have been sending messages and there is no need to clean out expired messages.

If the queue is loaded in memory, then the system determines whether any clients have been publishing messages to the queue. If message are being published to the queue, then the system may need to clean out expired messages. If no clients have been publishing messages to the queue, then there are no messages to clean out.

If message are being published to a queue that is loaded in memory, then the system determines if any consumer has been receiving messages from the queue for some recent period of time, such as during the last five minutes or some other configurable period. If no one has been receiving message from the queue during the configurable period, then the system may need to clean out expired messages. On the other hand, if some consumer has been receiving messages from the queue, then the queue is likely to have been cleaned out while sending messages.

If no one has been receiving message from the queue during the configurable period, then the system determines if the queue is nearing its quota. If the queue is nearing its quota, then the system begins an agent job that will scan the queue for messages that are expired and then delete the expired messages. The queue may be determined to be nearing its quota, for example, if the number of stored messages for the queue are greater than a predetermined number or are greater than a predetermined percentage of an assigned storage space.

The system will need to clean up expired messages only if messages are being sent to the queue. If no client is publishing messages to the queue, then there is no motivation to clean the queue to make room for additional messages. On the other hand, if messages are being published to the queue, the system will look for expired messages to be deleted to prevent the queue from overrunning its quota.

In other embodiments, as messages are read from the durable store, if the messages are expired, they are discarded. In this approach, the durable message store does not need to maintain information about the expiring messages. This method does not require any background processing by the message server and, therefore, provides a very efficient mechanism for discarding expired messages for the case where the percentage of expiring messages is low.

Alternatively, the message server, with the help of the durable store, tracks the list of expiring messages and removes them from the store as soon as they expire. In this case, the expired messages do not take up space in the underlying store. This process is useful for the case where a queue has a fixed quota and needs to be allocated for unexpired messages and in the case where higher percentage of messages can expire.

Figure 7:
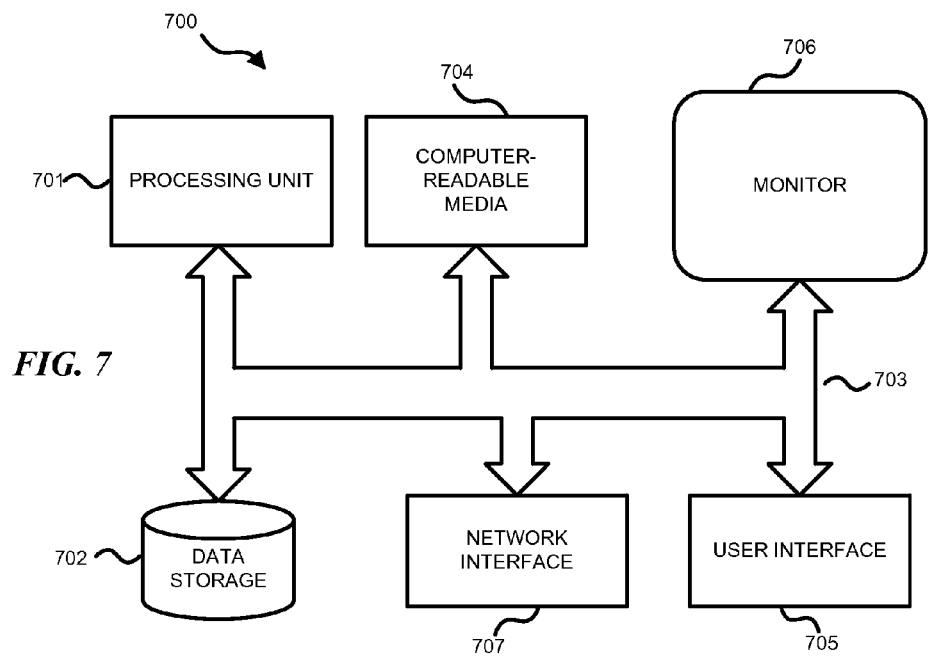
FIG. 7 illustrates an example of a suitable computing and networking environment on which embodiments may be implemented.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 700. Components may include, but are not limited to, processing unit 701, data storage 702, such as a system memory, and system bus 703 that couples various system components including the data storage 702 to the processing unit 701. The system bus 703 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 700 typically includes a variety of computer-readable media 704. Computer-readable media 704 may be any available media that can be accessed by the computer 701 and includes both volatile and nonvolatile media, and removable and non-removable media. By way of example, and not limitation, computer-readable media 704 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The data storage or system memory 702 includes computer storage media in the form of volatile and/or nonvolatile memory such as read only memory (ROM) and random access memory (RAM). A basic input/output system (BIOS), containing the basic routines that help to transfer information between elements within computer 700, such as during start-up, is typically stored in ROM. RAM typically contains data and/or program modules that are immediately accessible to and/or presently being operated on by processing unit 701. By way of example, and not limitation, data storage 702 holds an operating system, application programs, and other program modules and program data.

Data storage 702 may also include other removable/non-removable, volatile/nonvolatile computer storage media. By way of example only, data storage 702 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 7, provide storage of computer-readable instructions, data structures, program modules and other data for the computer 700.

A user may enter commands and information through a user interface 705 or other input devices such as a tablet, electronic digitizer, a microphone, keyboard, and/or pointing device, commonly referred to as mouse, trackball or touch pad. Other input devices may include a joystick, game pad, satellite dish, scanner, or the like. These and other input devices are often connected to the processing unit 701 through a user input interface 705 that is coupled to the system bus 703, but may be connected by other interface and bus structures, such as a parallel port, game port or a universal serial bus (USB). A monitor 706 or other type of display device is also connected to the system bus 703 via an interface, such as a video interface. The monitor 706 may also be integrated with a touch-screen panel or the like. Note that the monitor and/or touch screen panel can be physically coupled to a housing in which the computing device 700 is incorporated, such as in a tablet-type personal computer. In addition, computers such as the computing device 700 may also include other peripheral output devices such as speakers and printer, which may be connected through an output peripheral interface or the like.

The computer 700 may operate in a networked environment using logical connections 707 to one or more remote computers, such as a remote computer. The remote computer may be a personal computer, a server, a router, a network PC, a peer device or other common network node, and typically includes many or all of the elements described above relative to the computer 700. The logical connections depicted in FIG. 7 include one or more local area networks (LAN) and one or more wide area networks (WAN), but may also include other networks. Such networking environments are commonplace in offices, enterprise-wide computer networks, intranets and the Internet.

When used in a LAN networking environment, the computer 700 may be connected to a LAN through a network interface or adapter 707. When used in a WAN networking environment, the computer 700 typically includes a modem or other means for establishing communications over the WAN, such as the Internet. The modem, which may be internal or external, may be connected to the system bus 703 via the network interface 707 or other appropriate mechanism. A wireless networking component such as comprising an interface and antenna may be coupled through a suitable device such as an access point or peer computer to a WAN or LAN. In a networked environment, program modules depicted relative to the computer 700, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising: receiving messages at a message server from a source;
    collecting the messages into a plurality of groups based upon properties associated with the messages, wherein the properties associated with the messages used for grouping comprise message topics;
    storing messages of each of the plurality of groups in a corresponding one of a plurality of queues, wherein messages in a selected one the plurality of groups are directed from the source to an individual one of a plurality of destinations;
    and sending all of the messages in the selected group to the individual destination in a single transaction; wherein the destination is a gateway.

2. The method of claim 1, wherein each of the groups is buffered in a different one of the plurality of queues.

3. The method of claim 1, wherein the individual destination is a backend application configured to process the messages in the selected group.

4. The method of claim 1, wherein the messages are orders, wherein each of the plurality of queues is configured to store orders from different sources, and wherein the difference sources are present at a same location.

5. The method of claim 4, wherein the location is a city.

6. The method of claim 4, wherein each of the plurality of destinations is configured to apply a different location-specific processing to the orders.

7. The method of claim 6, wherein the location-specific processing includes a tax rate.

8. The method of claim 6, wherein the location specific-processing includes a delivery option.

9. A system, comprising:
    a processor; and
    a memory coupled to the processor, the memory having program instructions stored thereon that, upon execution by the processor, cause the system to:
    receive messages at a message server from a source;
    collect the messages into a plurality of groups based upon properties associated with the messages;
    store messages of each of the plurality of groups in a corresponding one of a plurality of queues, wherein messages in a selected one the plurality of groups were sent by the source to an individual one of a plurality of destinations; and
    send all of the messages in the selected group to the individual destination in a single transaction, wherein the destination is a gateway.

10. The system of claim 9, wherein the individual destination is a durable message store.

11. The system of claim 9, wherein the properties associated with the messages used for collecting comprise a destination address in a message header.

12. The system of claim 9, wherein the properties associated with the messages used for collecting comprise source address in a message header.

13. A computer-readable storage device comprising instructions that, when executed by a computer, cause the computer to:
    receive messages at a message server from a source;
    collect the messages into one or more a plurality of groups based upon properties associated with the messages store messages of each of the plurality of groups in a corresponding one of a plurality of queues, wherein messages in a selected one the plurality of groups were sent by the source to reach a single one of a plurality of destinations; and
    send all of the messages in the selected group to the single destination in a single transaction, wherein the messages are acknowledgements of previously sent messages; wherein the destination is a gateway.

* * * * *